(12) United States Patent
Ibe

(10) Patent No.: US 11,306,383 B2
(45) Date of Patent: Apr. 19, 2022

(54) THERMAL SPRAYING MATERIAL

(71) Applicant: FUJIMI INCORPORATED, Kiyosu (JP)

(72) Inventor: Hiroyuki Ibe, Kiyosu (JP)

(73) Assignee: FUJIMI INCORPORATED, Kiyosu (JP)

(*) Notice: Subject to any disclaimer, the term of this patent is extended or adjusted under 35 U.S.C. 154(b) by 313 days.

(21) Appl. No.: 16/333,893

(22) PCT Filed: Sep. 15, 2017

(86) PCT No.: PCT/JP2017/033523
§ 371 (c)(1),
(2) Date: Mar. 15, 2019

(87) PCT Pub. No.: WO2018/052129
PCT Pub. Date: Mar. 22, 2018

(65) Prior Publication Data
US 2019/0203329 A1    Jul. 4, 2019

(30) Foreign Application Priority Data
Sep. 16, 2016   (JP) .............................. JP2016-181958

(51) Int. Cl.
*C23C 4/04*       (2006.01)
*C01F 17/00*      (2020.01)
*C01F 17/265*     (2020.01)

(52) U.S. Cl.
CPC .............. *C23C 4/04* (2013.01); *C01F 17/265* (2020.01); *C01P 2002/72* (2013.01); *C01P 2004/03* (2013.01); *C01P 2004/32* (2013.01); *C01P 2004/61* (2013.01); *C01P 2006/11* (2013.01); *C01P 2006/62* (2013.01)

(58) Field of Classification Search
None
See application file for complete search history.

(56) References Cited

U.S. PATENT DOCUMENTS

2002/0015853 A1   2/2002   Wataya et al.
2002/0018902 A1   2/2002   Tsukatani et al.
2002/0177014 A1   11/2002  Kaneyoshi et al.
(Continued)

FOREIGN PATENT DOCUMENTS

CN    102242339 A    11/2011
JP    3523216 B2    4/2004
(Continued)

OTHER PUBLICATIONS

Office Action issued in corresponding Taiwanese Patent Application No. 106131686 dated Mar. 17, 2021.
(Continued)

*Primary Examiner* — Ronak C Patel
(74) *Attorney, Agent, or Firm* — Foley & Lardner LLP

(57) ABSTRACT

The present invention provides a thermal spraying material capable of forming a thermally sprayed coating film having improved plasma erosion resistance. This thermal spraying material contains composite particles in which a plurality of yttrium fluoride microparticles are integrated. This thermal spraying material has a lightness L of 91 or less in the Lab color space. This lightness L is more preferably 5 or more.

6 Claims, 3 Drawing Sheets

20µm

(56) References Cited

U.S. PATENT DOCUMENTS

| | | | |
|---|---|---|---|
| 2013/0122283 A1* | 5/2013 | Hamaya | C01F 17/206 428/328 |
| 2016/0244868 A1* | 8/2016 | Ibe | C04B 35/553 |
| 2018/0016193 A1 | 1/2018 | Fukagawa et al. | |

FOREIGN PATENT DOCUMENTS

| | | |
|---|---|---|
| JP | 3523222 B2 | 4/2004 |
| JP | 3672833 B2 | 7/2005 |
| JP | 4273292 B2 | 6/2009 |
| JP | 2013-122086 A | 6/2013 |
| JP | 2015-110844 A | 6/2015 |
| JP | 5861612 B2 | 2/2016 |
| JP | 2016-037653 A | 3/2016 |
| WO | WO-2016/140159 A1 | 9/2016 |

OTHER PUBLICATIONS

First Office Action on Non-Foley case related to U.S. Appl. No. 16/333,893 dated Sep. 25, 2020 (12 pages).
Office Action issued in Taiwanese Application 106131686, dated Dec. 1, 2020.
Office Action issued in corresponding Chinese Patent Application No. 201780056720.1 dated May 20, 2021.
Office Action issued in corresponding Korean application No. 10-2019-7010239 dated Nov. 1, 2021 with English translation.

\* cited by examiner

20μm

20μm

THERMAL SPRAYING MATERIAL

TECHNICAL FIELD

The present invention relates to a thermal spraying material that contains yttrium fluoride.

The present application claims priority on the basis of Japanese Patent Application No. 2016-181958, which was filed on 16 Sep. 2016, and the entire contents of that application are incorporated by reference in the present specification.

BACKGROUND ART

Techniques for imparting new types of functionality by covering base material surfaces with a variety of materials have been used in the past in a variety of fields. For example, thermal spraying methods, in which thermal spraying particles comprising a material such as a ceramic are blown in a softened or molten state onto a base material surface by means of combustion, electrical energy, or the like, so as to form a thermally sprayed coating film comprising the material, are known as one such type of surface covering technique.

In the production of semiconductor devices and the like, semiconductor substrate surfaces are often subjected to micromachining by means of dry etching involving the use of plasma of a halogen-based gas such as fluorine, chlorine or bromine inside a vacuum chamber (container). In addition, the inside of the chamber is cleaned using oxygen plasma after the semiconductor substrate has been removed following the dry etching. On such occasion, members inside the chamber that have been exposed to highly reactive oxygen gas plasma or halogen gas plasma can become eroded. In addition, if eroded parts fall as particles from eroded members, the particles become attached to the semiconductor substrate and become foreign bodies that cause circuit defects (hereinafter, these foreign bodies are referred to as particles).

In order to reduce the occurrence of particles in the past, members of semiconductor device production apparatuses that were exposed to eroding plasma of oxygen gas, halogen gases, and the like, were provided with ceramic thermally sprayed coating films that were resistant to erosion by plasma (hereinafter referred to as plasma erosion resistance). For example, PTL 1 to 5 indicate that it is possible to form thermally sprayed coating films having high plasma erosion resistance by using a rare earth element-containing compound as a thermal spraying material.

CITATION LIST

Patent Literature

Patent Literature 1: Japanese Patent No. 3523216
Patent Literature 2: Japanese Patent No. 3523222
Patent Literature 3: Japanese Patent No. 4273292
Patent Literature 4: Japanese Patent No. 5861612
Patent Literature 5: Japanese Patent No. 3672833

SUMMARY OF INVENTION

Technical Problem

However, as the degree of integration of semiconductor devices has improved, a need has arisen for stricter controls in terms of preventing contamination by particles. Thermally sprayed coating films provided on semiconductor device production apparatuses also require further improvements in terms of plasma erosion resistance. For example, there is a need to suppress the occurrence of finer particles, which were allowed in the past. For example, there is a need to suppress the occurrence of particles having diameters of 0.2 μm or less.

With these circumstances in mind, the purpose of the present invention is to provide a thermal spraying material capable of forming a thermally sprayed coating film having improved plasma erosion resistance. Another purpose of the present invention is to provide a thermally sprayed coating film-equipped member, which is formed using this thermal spraying material.

Solution to Problem

As mentioned above, it is known that a thermally sprayed coating film having relatively excellent erosion resistance can be formed by using a rare earth element-containing compound as a thermal spraying material. Typical examples of this rare earth element-containing compound include yttrium fluoride ($YF_3$), yttrium oxide ($Y_2O_3$) and yttrium oxyfluoride (YOF). In addition, when thermal spraying is carried out using a conventional thermal spraying material, these rare earth element-containing compounds are oxidized during thermal spraying, which results in rare earth element oxides (typically yttrium oxide) being contained at a relatively high proportion in the obtained thermally sprayed coating film as a matter of course. As a result of diligent research, the inventors of the present invention found that when a rare earth element oxide was contained in a thermally sprayed coating film, parts comprising this rare earth element-containing oxide were a source of ultrafine particles that had been overlooked in the past. In order for a thermally sprayed coating film to be free of rare earth element-containing oxides that are a source of ultrafine particles, it is necessary for the thermal spraying material to not contain a rare earth element-containing oxide and also necessary to use, as the thermal spraying material, a compound that is unlikely to form a rare earth element-containing oxide in a thermal spraying environment. The present invention was completed on the basis of such ideas.

The present invention provides a thermal spraying material having the characteristics described below as a means for solving the problems mentioned above. That is, the thermal spraying material disclosed here contains composite particles in which a plurality of yttrium fluoride microparticles are integrated. Another characteristic of the present invention is that the lightness L in the Lab color space is 91 or less.

Therefore, the thermal spraying material disclosed here is, in general terms, a powder comprising composite particles of yttrium fluoride microparticles. In addition, this thermal spraying material is relatively dark, with a coordinate L, which indicates lightness, of 91 or less. The details are not clear, but in this type of thermal spraying material, composite particles do not disintegrate and are unlikely to be oxidized even when exposed to a high temperature gas jet such as a plasma flame. Therefore, by using this thermal spraying material, it is possible to form a thermally sprayed coating film in which the yttrium fluoride composition is maintained. It is even possible to form a thermally sprayed coating film in which the occurrence of finer particles (for example, particles having diameters of 0.2 μm or less) is suppressed. In addition, this type of thermally sprayed coating film can be formed at a high film formation rate.

Moreover, the Lab color space is a type of color coordinate system (complementary color space) proposed by Hunter in 1948, which is denoted by lightness (also referred to as a dimension) L and complementary color dimensions a and b, and is derived by compressing coordinates of the CIE XYZ color space into a non-linear form. In the Lab system, complementary colors, namely red-green and blue-yellow are disposed at the ends of orthogonal coordinates comprising the a axis and b axis, and the L axis indicates lightness (brightness) in a direction perpendicular to a plane derived from the a axis and b axis. Here, the dimension L takes a value between 0% and 100%, and approaches 100 as the color approaches white and becomes lighter and approaches 0 as the color approaches black. The dimension L in the Lab color space can be calculated using, for example, old JIS Z 8730:1980. In the present specification, the dimension L in the Lab color space can be a value measured using a photoelectric colorimeter, a color difference meter, or the like.

Moreover, PTL 1 to 5 disclose powders, which are non-granulated powders (hereinafter, the term "powders", when used solely, refers to non-granulated powders), and granulated powders comprising particles comprising rare earth element-containing compounds as thermal spraying materials. Here, these powders and granulated powders are produced using rare earth element-containing compounds as starting materials. However, production conditions for the thermal spraying materials disclosed in PTL 1, 2 and 5 are oxidizing conditions, and rare earth element oxides that are not explicitly disclosed are inevitably contained in the thermal spraying materials. In addition, PTL 2 and 4 disclose producing thermal spraying materials under non-oxidizing conditions, but these thermal spraying materials are produced in the form of granulated particles that are granulated by means of weak binding. Therefore, oxidation of these particles cannot be avoided during thermal spraying, and a thermally sprayed coating film contains rare earth element oxides. In addition, PTL 3 discloses a thermal spraying material comprising rare earth element-containing compound (non-granulated) particles having a polyhedral shape, which are synthesized using a liquid phase method. However, because particles in this thermal spraying material are sharp-cornered polyhedrons, melting properties during thermal spraying and fluidity are low, and it is difficult to form a compact thermally sprayed coating film. Therefore, the thermal spraying material disclosed here can be differentiated from these inventions.

In a preferred aspect of the thermal spraying material disclosed here, the lightness L is 5 or more. A thermal spraying material having such a constitution is preferred from the perspectives of achieving the advantageous effect mentioned above while being able to be produced relatively inexpensively.

A preferred aspect of the thermal spraying material disclosed here is a powder which comprises a plurality of the composite particles mentioned above and which is characterized in that the bulk density of the powder is 1 to 1.7 g/cm$^3$. Such a bulk density is a high value for composite particles, and the composite particles are in a compact form due to yttrium fluoride microparticles being bound together by means of sintering or the like and the binding progressing sufficiently. Therefore, a thermally sprayed coating film formed using this thermal spraying material can also be more compact. As a result, this thermal spraying material is preferred because the plasma erosion resistance of a thermally sprayed coating film can be further increased. In addition, the thermal spraying material has a high density for composite particles, and can have an appropriate weight. Therefore, this thermal spraying material is also preferred from the perspective of resistance to an air stream being low when the thermal spraying material is blown onto a base material from a thermal spraying device at high speed during thermal spraying.

The bulk density can be a value (initial bulk density) measured in accordance with the fine ceramic powder bulk density measurement method specified in HS R 1628:1997. In the present specification, bulk density is measured using a constant mass measurement method.

A preferred aspect of the thermal spraying material disclosed here is characterized in that in an electron microscope observation of the composite particles, 40% by number or more of the yttrium fluoride microparticles are bound to and integrated with each other. That is, yttrium fluoride microparticles are integrated with each other directly, not bound by means of a binder such as a resin or metal. Integration is typically carried out by means of sintering. The high compressive strength of the composite particles can be advantageously realized by using this type of constitution.

A preferred aspect of the thermal spraying material disclosed here is a powder which comprises a plurality of the composite particles mentioned above and which is characterized in that the average particle diameter of the powder is 10 to 100 μm. Composite particles having this average particle diameter are preferred due to readily melting during thermal spraying and being unlikely to volatilize, thereby enabling a compact thermally sprayed coating film to be formed with good efficiency. In addition, individual composite particles have an appropriate weight, and are therefore also preferred from the perspective of resistance to an air stream being low when the thermal spraying material is blown from a thermal spraying device during thermal spraying.

In the invention disclosed here, the average particle diameter of the thermal spraying material is the $D_{50}$ particle diameter, which corresponds to a cumulative 50% in a volume-based particle size distribution measured using a laser diffraction/light-scattering type particle size distribution measurement apparatus.

A preferred aspect of the thermal spraying material disclosed here is characterized in that no diffraction peak attributable to yttrium oxide is detected in X-Ray diffraction analysis of the powder. That is, this thermal spraying material does not contain yttrium oxide. As a result, when thermal spraying is carried out using this thermal spraying material, it is possible to more reliably prevent yttrium oxide from being contained in a formed thermally sprayed coating film.

As mentioned above, oxidation caused by thermal spraying is suppressed in the thermal spraying material disclosed here. Therefore, the thermal spraying material per se is constituted from yttrium fluoride, and not only is incorporation of yttrium oxide suppressed in the thermal spraying material, but it is also possible to suppress incorporation of yttrium oxide in a thermally sprayed coating film that is a thermally sprayed product of the thermal spraying material. In addition, the thermal spraying material disclosed here is in the form of composite particles in which a plurality of microparticles are integrated. Therefore, scattering caused by thermal spraying is suppressed, the composite particles are sufficiently melted to the core parts thereof, and the thermal spraying material can be densely built up on a base material. As a result, it is possible to form a compact thermally sprayed coating film having a low porosity.

Moreover, in the invention disclosed here, halogen gas plasma is typically plasma generated using a plasma-generating gas that contains a halogen-based gas (a halogen compound gas). Specific examples thereof include fluorine-based gases such as $SF_6$, $CF_4$, $CHF_3$, $ClF_3$ and HF, chlorine-based gases such as $Cl_2$, $BCl_3$ and HCl, and bromine-based gases such as HBr, which are used in dry etching processes and the like when producing semiconductor substrates. It is possible to use one of these gases in isolation, or a mixture of two or more types thereof. In addition, the halogen-based gas may be used as a mixed gas obtained by mixing with an inert gas such as argon (Ar).

DESCRIPTION OF EMBODIMENTS

Figure 1:
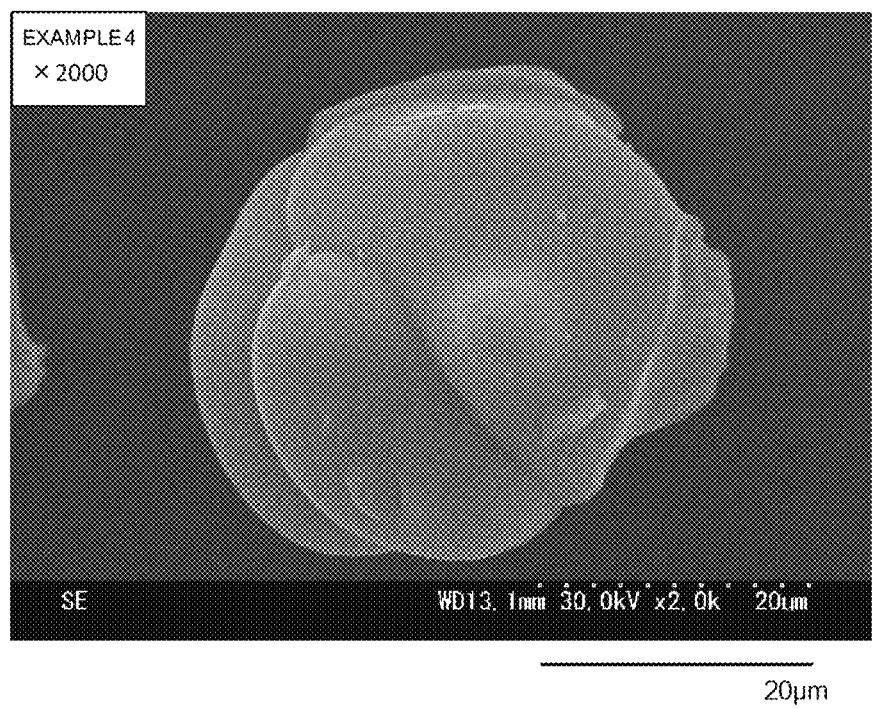
FIG. 1 is a SEM image showing a composite particle in the thermal spraying material of Example 4, which is a working example.

Preferred embodiments of the present invention will now be explained. Moreover, matters which are essential for carrying out the invention and which are matters other than those explicitly mentioned in the present specification are matters that a person skilled in the art could understand to be matters of design on the basis of the prior art in this technical field. The present invention can be carried out on the basis of the matters disclosed in the present specification and common general technical knowledge in this technical field. In addition, in the present specification, a numerical range indicated by "X to Y" means "not less than X and not more than Y", unless explicitly indicated otherwise.

[Thermal Spraying Material]

The thermal spraying material disclosed here is a powder in which a plurality of composite particles have been aggregated. Individual composite particles that constitute the powder are integrated by yttrium fluoride microparticles binding to each other. The composite particles as a whole have an approximately spherical shape. In other words, the composite particles have a two-dimensional bound aggregated form in which primary yttrium fluoride microparticles are bound to each other. Here, the yttrium fluoride microparticles also typically have a rounded shape, not a sharp-cornered shape. By having a relatively large particle diameter, the composite particles can give a thermal spraying material which exhibits excellent handleability and high thermally sprayed coating film-forming efficiency. Meanwhile, because the yttrium fluoride microparticles have relatively small particle diameters, the thermal spraying material readily melts during thermal spraying and can form a thermally sprayed coating film having few pores and having good adhesive properties. In addition, the composite particles have a two-dimensionally round shape (as a whole), and can therefore give a thermal spraying material having a higher fluidity than a powder having a relatively small particle diameter. Integration occurs as a result of, for example, 40% by number or more of the yttrium fluoride microparticles binding to each other. Integration occurs as a result of preferably 50% by number or more, more preferably 75% by number or more, and particularly preferably 95% by number or more, for example substantially 100% by number, of the yttrium fluoride microparticles binding to each other. The manner in which the yttrium fluoride microparticles are bound to each other can be confirmed by means of, for example, electron microscope observations of the composite particles.

Yttrium fluoride microparticles are not bound by means of a heterogeneous material such as a binder, but are directly bound to each other. Yttrium fluoride microparticles may be bound to other yttrium fluoride microparticles by points (extremely small areas) or by relatively large areas. It is preferable for these microparticles to be bound by relatively large areas. Pores may or may not be present between individual yttrium fluoride microparticles. The proportion of pores should be low. In addition, individual yttrium fluoride microparticles may, on the whole, be in the form of independent particles, but a plurality of microparticles may also be integrally bound to each other by a large area so as to constitute a single spherical composite particle. Moreover, when two or more particles are bound by a large area, an outline observed as contrast in an electron microscope observation can be understood to be a boundary between particles. In addition, the term "spherical" used here does not mean only a shape that is geometrically completely spherical, but also encompasses a shape which appears broadly spherical with no conspicuous corners or protrusions.

The thermal spraying material disclosed here is constituted mainly from yttrium fluoride, which is a constituent component of the yttrium fluoride microparticles. Yttrium fluoride is a compound represented by the general formula $YF_3$. Here, "constituted mainly from yttrium fluoride" means that 80% by mass or more of the overall thermal spraying material is constituted from yttrium fluoride. In other words, among crystal phases detected in X-Ray diffraction analysis of the thermal spraying material, the proportion of crystal phases attributable to yttrium fluoride is 80% by mass or more. Moreover, the proportion of yttrium fluoride in the thermal spraying material is preferably 90% by mass or more, more preferably 95% by mass or more, and particularly preferably 98% by mass or more, and may be, for example 99% by mass or more or 99.5% by mass or more. It is preferable for the proportion of yttrium fluoride to be substantially 100% by mass. If, for example, no diffraction peak attributable to a compound other than yttrium fluoride is detected in X-Ray diffraction analysis of the thermal spraying material, it can be understood that the proportion of yttrium fluoride is substantially 100% by mass.

Moreover, the thermal spraying material disclosed here may of course contain components other than yttrium fluoride. Components other than yttrium fluoride are preferably compounds having compositions that are unlikely to form oxides when exposed to an oxidizing environment caused by thermal spraying. Preferred examples of such compounds include yttrium oxyfluorides, which are unlikely to immediately form yttrium oxide in an oxidizing atmosphere. Any compound containing yttrium (Y), oxygen (O) and fluorine (F) as constituent elements can be considered as an yttrium oxyfluoride. Specifically, yttrium oxyfluorides can be compounds represented by general formulae such as YOF, $Y_2OF_4$, $Y_5O_4F_7$, $Y_6O_5F_8$, $Y_7O_6F_9$ and $Y_{17}O_{14}F_{23}$. It has been observed that these compounds do not generate yttrium oxide up to a proportion of 1.5 moles of oxygen relative to 1 mole of yttrium in an oxidizing atmosphere caused by thermal spraying. Therefore, these compounds are preferred from the perspective of not immediately forming yttrium oxide in an oxidizing atmosphere.

Such an yttrium oxyfluoride proportion is not strictly limited, but yttrium oxyfluorides can be contained in the thermal spraying material at a quantity of, for example, 20% by mass or less from the perspective of increasing the yttrium fluoride content. The proportion of yttrium oxyfluorides is, for example, preferably 10% by mass or less, more preferably 5% by mass or less, and particularly preferably 2% by mass or less or 1% by mass or less, for example 0.5% by mass or less. In addition, a preferred aspect can be one in which the thermal spraying material is constituted substantially from only yttrium fluoride and yttrium oxyfluorides. In such cases, it can be understood that no diffraction peak attributable to a compound other than yttrium fluoride and yttrium oxyfluorides is detected when the thermal spraying material is subjected to X-Ray diffraction analysis.

Meanwhile, it is preferable for the thermal spraying material to contain no yttrium oxide, which is a source of ultrafine particles, at the thermal spraying material stage. Therefore, the content of yttrium oxide in the thermal spraying material is preferably 3% by mass or less, and more preferably 1% by mass or less, and it is preferable for the thermal spraying material to contain substantially no yttrium oxide. Therefore, a preferred aspect can be one in which no diffraction peak attributable to yttrium oxide is detected when the thermal spraying material is subjected to X-Ray diffraction analysis.

In addition, the thermal spraying material disclosed here has a lightness L of 91 or less in the Lab color space. Ordinary yttrium fluoride powders, yttrium oxide powders, and the like, are white powders having lightness L values of approximately 97 or more. Therefore, the thermal spraying material disclosed here can be said to be, for example, relatively gray, with a dull hue. This type of somewhat gray yttrium fluoride is attributable to yttrium fluoride ($YF_3$) in X-Ray diffraction analysis, but can have a hue that can be seen in, for example, yttrium fluoride from which fluorine has been lost. That is, in the thermal spraying material disclosed here, it can be said that the amount of fluorine per 1 mole is lower than in yttrium fluoride strictly represented by the general formula $YF_3$. However, within the meaning "attributable to $YF_3$ in X-Ray diffraction analysis", this may be expressed as "maintaining the composition (of $YF_3$)" in the present specification. The thermal spraying material disclosed here is constituted from composite particles of gray yttrium fluoride microparticles (which typically show loss of fluorine) despite maintaining the composition of yttrium fluoride. The detailed mechanism is not clear, but by being constituted in this way, composite particles in the thermal spraying material are unlikely to be oxidized even when exposed to a high temperature gas jet such as a plasma flame. Therefore, by using this thermal spraying material for thermal spraying, it is possible to form a thermally sprayed coating film in which the yttrium fluoride composition is maintained. The lightness L of the thermal spraying material is preferably 90 or less, more preferably 88 or less, and particularly preferably 86 or less. The lightness L may be, for example, 85 or less, and may be 83 or less.

In addition, the lower limit of the lightness L of the thermal spraying material is not particularly limited. According to investigations by the inventors of the present invention, the thermal spraying material can have an extremely low lightness L of, for example, less than 5 (typically not less than 1 but less than 5, for example 4.2 etc.) as a result of production conditions. However, in order to obtain a thermal spraying material having such a low lightness, it is essential to prepare a relatively expensive helium gas atmosphere as a firing atmosphere when producing the thermal spraying material described below. Therefore, it is preferable for the lightness of the thermal spraying material to be 5 or more from the perspective of being able to produce the thermal spraying material relatively inexpensively. The lightness of the thermal spraying material can be 10 or more or 20 or more, and can be, for example, 30 or more or 40 or more. Because ordinary yttrium fluoride powders are substantially white, the lightness of the thermal spraying material may be approximately 50 or more.

In addition, the thermal spraying material disclosed here may be a product in which individual yttrium fluoride microparticles are bound to each other by relatively large areas, as mentioned above. As a result, this thermal spraying material may be a compact material in which inclusion of pores is suppressed despite being composite particles. By using this type of compact thermal spraying material that is unlikely to be oxidized, it is possible to produce a thermally sprayed coating film which has a low porosity and exhibits excellent plasma erosion resistance. From this perspective, the bulk density of the thermal spraying material is, for example, preferably 1 $g/cm^3$ or more, more preferably 1.1 $g/cm^3$ or more, and further preferably 1.15 $g/cm^3$ or more. The bulk density may be 1.2 $g/cm^3$ or more, and may be 1.25 $g/cm^3$ or more. The upper limit for the bulk density is not particularly limited, and 1.7 $g/cm^3$ or less, for example, can be a guide. Moreover, if the lightness L is sufficiently low, it is possible to increase erosion resistance even if the bulk density is not necessarily high. From this perspective, if the lightness L is approximately 88 or less, the bulk density may be 1.25 $g/cm^3$ or less or 1.2 $g/cm^3$ or less.

This type of thermal spraying material is not necessarily limited to this, but can be advantageously produced by using an ultrafine yttrium fluoride powder as a raw material, granulating this yttrium fluoride ultrafine powder into a spherical form, and then sintering while maintaining the composition.

The granulation method is not particularly limited, and a variety of publicly known granulation methods can be used. Specifically, it is possible to use one or more methods such as oscillating granulation methods, fluidized bed granulation methods, agitation granulation methods, compression granulation methods, extrusion granulation methods, fragmentation granulation methods and spray drying methods. A spray drying method is preferred. When firing the granulated powder, an ordinary batch type kiln or continuous type kiln can be used without particular limitation.

In ordinary granulated powders, ultrafine particles that are primary particles are simply integrally aggregated using a binder, for example (bound using a binder). Relatively large pores are present between ultrafine particles in such granulated powders. Therefore, ordinary granulated powders are such that relatively large pores are present between ultrafine particles and are taken to mean "granules".

Conversely, by sintering ultrafine particles of an ultrafine yttrium fluoride powder, a binder is eliminated and the ultrafine particles bond directly to each other to lower the surface energy. Integrally bonded composite particles are realized in this way, as mentioned above. Moreover, the area of binding portions (interfaces) increases and binding strength greatly increases as sintering progresses. In addition, as a result of substance movement in sintered particles, the ultrafine particles are rounded into a more stable spherical form. At the same time, pores present inside the granulated powder are discharged, and the powder becomes more compact. In the thermal spraying material disclosed here, as this type of sintering progresses, ultrafine particles that constitute the ultrafine powder used as the raw material may become coarser as a result of grain growth. For example, in composite particles in the thermal spraying material, the volume of pores relative to the granulated particles decreases, and pores may be eliminated. For example, a plurality of ultrafine particles may integrate and become coarser, and may appear to be a single particle (a yttrium fluoride microparticle). In such cases, it is understood that coarse ultrafine particles are yttrium fluoride microparticles in composite particles.

Moreover, when non-oxide materials are sintered, the materials generally undergo oxidation. In the thermal spraying material disclosed here, the yttrium fluoride composition is maintained, as mentioned above, despite the thermal spraying material comprising composite particles that are integrated by being sintered. That is, substantially no oxidation occurs. This feature is significantly different from publicly known thermal spraying materials obtained using yttrium fluoride as a starting material and publicly known yttrium fluoride-containing thermal spraying materials.

In addition, in the thermal spraying material disclosed here, even if an ultrafine yttrium fluoride powder having a lightness L of 97 or more is used as a raw material, the lightness L of composite particles obtained following sintering can be lowered to 91 or less. That is, fluorine loss is introduced by the sintering. The lightness L of such composite particles cannot be achieved by means of ordinary firing. Ordinary firing typically means firing in an atmospheric atmosphere or oxidizing atmosphere. The lightness L of the thermal spraying material disclosed here can be advantageously achieved by firing a binder-containing granulated powder, as mentioned above, under conditions in which oxidation is suppressed.

Firing conditions for the sintering are not particularly restricted as long as the composition of the yttrium fluoride does not change when sintering has progressed sufficiently. A rough guide for firing conditions can be, for example, heating at a temperature of not lower than 900° C. but lower than the melting point (for example, lower than 1200° C.) in a non-oxidizing atmosphere. If the firing temperature is too low, sintering does not progress sufficiently and composite particles having a lightness L of 91 or less cannot be obtained. From this perspective, the firing temperature is more preferably 950° C. or higher, further preferably 1000° C. or higher, and particularly preferably 1050° C. or higher. If the firing temperature is too high, the yttrium fluoride volatilizes and production efficiency decreases, which is not desirable. Moreover, bulk yttrium fluoride has a melting point of approximately 1387° C., but because the particle diameter of the raw material yttrium fluoride powder being used is substantially small, the melting point thereof can be approximately 1200° C.

The firing atmosphere can be, for example, an inert atmosphere or a vacuum atmosphere so that the composition of the yttrium fluoride does not change. In such cases, an inert atmosphere is an oxygen-free atmosphere, and can be a noble gas atmosphere, such as argon (Ar), neon (Ne) or helium (He), or a non-oxidizing atmosphere such as nitrogen ($N_2$). Moreover, in cases where a batch type kiln is used, the atmosphere inside the kiln should be, for example, a non-oxidizing atmosphere. In addition, in cases where a continuous type kiln is used, sintering should be carried out after introducing a non-oxidizing gas stream into the region of the kiln in which heating is carried out (the region in which sintering progresses). When producing the thermal spraying material disclosed here, an atmospheric atmosphere or vacuum atmosphere should be avoided because it would not be possible to avoid oxidation of the yttrium fluoride in the sintering process.

Meanwhile, according to investigations by the inventors of the present invention, when a binder in the granulated powder is burned off by the firing carried out under the conditions mentioned above, carbon (C) components that constitute the binder are burned off and fluorine (F) components in the yttrium fluoride are also burned off. In addition, it is thought that loss of fluorine from the yttrium fluoride tends to increase as the amount of binder contained in the granulated powder increases. That is, it is thought that the lightness L of the thermal spraying material can be controlled by adjusting the amount of binder in the granulated powder. The amount of binder in the granulated powder also depends on the composition of the binder, and is not therefore strictly controlled, but as a rough guide, the amount of binder can be 0.1 part by mass or more, such as 0.5 part by mass or more, and 10 parts by mass or less, such as 5 parts by mass or less, relative to 100 parts by mass of the ultrafine yttrium fluoride powder.

Moreover, the average particle diameter of the ultrafine yttrium fluoride powder used as a starting material is not particularly limited, and is not particularly limited as long as this is a size whereby a thermal spraying material having a desired average particle diameter can be obtained in the form of composite particles. However, the details are not clear, but this is preferred from the perspective that a compact thermal spraying material having a high bulk density can be easily obtained as the average particle diameter of the starting material decreases. From this perspective, the average particle diameter of the ultrafine yttrium fluoride powder used as a starting material is preferably 10 μm or less, more preferably 8 μm or less, further preferably 5 μm or less, and particularly preferably 1 μm or less, and is preferably, for example, 0.5 μm or less, and preferably 0.2 μm or less. The lower limit for the average particle diameter of the starting material can be, for example, 0.05 μm or more from perspectives such as ease of handling and ease of granulation. Meanwhile, in cases where the lightness of the thermal spraying material is sufficiently low, it is not necessary for the average particle diameter of the ultrafine yttrium fluoride powder used as a starting material to be so low. In such cases, the average particle diameter of the starting material can be, for example, 0.5 μm or more or 1 μm or more, with 1 to 5 μm being a preferred example.

Moreover, the thermal spraying material described above may be modified in a variety of ways as long as the purpose of the invention is not impaired. For example, the thermal spraying material is constituted mainly from yttrium fluoride, but some of the yttrium in the yttrium fluoride may be substituted with other rare earth elements. These rare earth elements are not particularly limited, and can be selected, as appropriate, from among scandium and lanthanoid elements. Specifically, scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu) can be considered. From perspectives such as improving plasma erosion resistance and cost, La, Gd, Tb, Eu, Yb, Dy, Ce, and the like, can be advantageously used. It is possible to incorporate one of these rare earth elements in isolation or a combination of two or more types thereof. These rare earth elements may be contained in, for example, the raw material powder.

Similarly, the thermal spraying material is constituted mainly from yttrium fluoride, but some of the fluorine in the yttrium fluoride may be substituted with other halogen elements. These halogen elements are not particularly limited, and may be any element belonging to group 17 of the periodic table of the elements. Specifically, it is possible to use any one of halogen atoms such as chlorine (Cl), bromine (Br), iodine (I) and astatine (At) in isolation, or a combination of two or more thereof. F, Cl and Br are preferred. These halogen elements may be contained in, for example, the raw material powder.

Moreover, in a thermal spraying material obtained in this way, the external shape of the composite particles can be such that the average aspect ratio, as seen from above, is approximately 1.3 or less. That is to say, by producing the thermal spraying material using a spray drying method, it is possible to form approximately spherical composite particles. Particles that are three-dimensionally almost spherical have a two-dimensional aspect ratio of close to 1. In this thermal spraying material, the average aspect ratio of the thermal spraying material as a whole can be 1.5 or less, and is preferably 1.4 or less, more preferably 1.3 or less, and particularly preferably 1.2 or less, for example 1.15 or less. Moreover, this average aspect ratio is an arithmetic mean value of the aspect ratio determined for planar images (e.g., two-dimensional images) of 10 or more composite particles observed using an observation means such as an electron microscope. In addition, aspect ratio is defined as a/b, where a is the length of the longest side and b is the length of the shortest side in a circumscribed rectangle having the minimum area for circumscribing a composite particle. This average aspect ratio can be determined by, for example, using manual calculations or image processing software to analyze an electron microscope image taken at a suitable magnification (for example, 2000 times).

In addition, in the thermal spraying material disclosed here, the composite particles described above are sufficiently sintered. As a result, disintegration of the composite particles is suppressed when the thermal spraying material is stored, supplied to a thermal spraying apparatus or thermally sprayed. As a result, a thermal spraying material having excellent fluidity and supply properties can be realized. In addition, the proportion of yttrium fluoride microparticles that are inevitably contained as individual microparticles having smaller particle diameters can be reduced. Therefore, it is possible to suppress oxidation and degeneration of the thermal spraying material even in cases where the thermal spraying material is supplied to a high temperature gas jet during thermal spraying. In addition, it is possible to form a thermally sprayed coating film with high efficiency without the composite particles disintegrating or being repelled from a flame, even in a plasma flame for example.

Moreover, the average particle diameter of the thermal spraying material described above can be made suitable for the thermal spraying device being used. Typically, the average particle diameter of the thermal spraying material can be approximately 100 μm or less, and is preferably 50 μm or less, and more preferably 40 μm or less, and can be approximately 35 μm or less. The lower limit for the average particle diameter is not strictly controlled, and in cases where the fluidity of the thermal spraying material is to be considered, the average particle diameter can be, for example, 5 μm or more, and is preferably 10 μm or more, and more preferably 15 μm or more, and can be, for example 20 μm or more.

[Thermally Sprayed Coating Film-Equipped Member]

By thermally spraying a base material with the thermal spraying material described above, it is possible to form a thermally sprayed coating film on a surface of the base material. A thermally sprayed coating film-equipped member is provided by providing this thermally sprayed coating film on the surface of the base material.

[Base Material]

In the thermally sprayed coating film-equipped member disclosed here, the base material on which the thermally sprayed coating film is formed is not particularly limited. For example, the material, form, and the like, of the base material are not particularly limited as long as the base material comprises a material having the desired resistance to thermal spraying of a thermal spraying material. Examples of materials that constitute the base material include a variety of metallic materials, such as metals, metalloids and alloys of these, and a variety of inorganic materials. Specifically, examples of metallic materials include metallic materials including aluminum, aluminum alloys, iron, steel, copper, copper alloys, nickel, nickel alloys, gold, silver, bismuth, manganese, zinc and zinc alloys; and metalloid materials including group IV semiconductors such as silicon (Si) and germanium (Ge), group II-VI compound semiconductors such as zinc selenide (ZnSe), cadmium sulfide (CdS) and zinc oxide (ZnO), group III-V compound semiconductors such as gallium arsenide (GaAs), indium phosphide (InP) and gallium nitride (GaN), group IV compound semiconductors such as silicon carbide (SiC) and silicon-germanium (SiGe), and chalcopyrite type semiconductors such as Copper Indium Selenium ($CuInSe_2$). Examples of inorganic materials include calcium fluoride (CaF), quartz ($SiO_2$) substrate materials, oxide ceramics such as alumina ($Al_2O_3$) and zirconia ($ZrO_2$), nitride ceramics such as silicon nitride ($Si_3N_4$), boron nitride (BN) and titanium nitride (TiN), and carbide ceramics such as silicon carbide (SiC) and tungsten carbide (WC). It is possible to use one of these materials to constitute the base material or constitute a base material by complexing two or more of these. Of these, types of steel such as a variety of SUS materials (so-called stainless steels), which have relatively high coefficients of thermal expansion among commonly used metallic materials, heat-resistant alloys such as Inconel, low expansion alloys such as Invar and Kovar, corrosion-resistant alloys such as Hastelloy, and aluminum alloys represented by 1000 series to 7000 series aluminum alloys that are useful as light weight structural materials can be given as preferred examples of the base material. Such base materials can be, for example, members that constitute semiconductor device production apparatuses and members that are exposed to highly reactive oxygen gas plasma or halogen gas plasma. For example, silicon carbide (SiC) and the like can be classified into different categories as a compound semiconductor, an inorganic material, or the like, according to convenience such as intended use, but can be the same material.

[Method for Forming Thermally Sprayed Coating Film]

Moreover, the thermally sprayed coating film mentioned above can be formed by supplying the thermal spraying material disclosed here to a thermal spraying apparatus on the basis of a publicly known thermal spraying method. That is, a thermally sprayed coating film comprising this material is formed by blowing a powdered thermal spraying material in a softened or molten state by means of a heat source such as combustion or electrical energy. The method for thermally spraying this thermal spraying material is not particularly limited. For example, thermal spraying methods such as plasma spraying methods, high velocity flame spraying methods, flame spraying methods, detonation flame spraying methods and aerosol deposition methods can be advantageously used. Characteristics of the thermally sprayed coating film may depend to a certain extent on the thermal spraying method and thermal spraying conditions. However, regardless of the thermal spraying method and thermal spraying conditions, by using the thermal spraying material disclosed here, it is possible to form a thermally sprayed coating film having improved plasma erosion resistance compared to cases in which other thermal spraying materials are used.

A plasma spraying method is a thermal spraying method in which a plasma flame is used as a thermal spraying heat source for softening or melting a thermal spraying material. An arc is generated between electrodes, and when a working gas is plasmafied by the arc, the plasma stream is ejected as a high temperature high speed plasma jet from a nozzle. Plasma spraying methods encompass coating methods in which a thermally sprayed coating film is obtained by introducing a thermal spraying material into this plasma jet and heating and accelerating the thermal spraying material so as to deposit the thermal spraying material on a base material. Moreover, plasma spraying methods can be types such as atmospheric plasma spraying (APS) that is carried out in air, low pressure plasma spraying (LPS), in which thermal spraying is carried out at a lower pressure than atmospheric pressure, and high pressure plasma spraying, in which plasma spraying is carried out in a pressurized container at a higher pressure than atmospheric pressure. For example, when this type of plasma spraying is used, a thermal spraying material is melted and accelerated by a plasma jet at a temperature of approximately 5000° C. to 10,000° C., thereby enabling the thermal spraying material to impact on a base material at a speed of approximately 300 to 600 m/s and accumulate on the base material.

In addition, high velocity oxygen fuel (HVOF) flame spraying methods, warm spraying methods, high velocity air fuel (HVAF) flame spraying methods, and the like, can be considered as high velocity flame spraying methods.

A HVOF spraying method is a type of flame spraying method in which a fuel and oxygen are mixed and combusted under high pressure to produce a combustion flame, and the combustion flame is used as a heat source for thermal spraying. By increasing the pressure in a combustion chamber, a high speed (possibly supersonic) high temperature gas stream is ejected from a nozzle while maintaining a continuous combustion flame. HVOF thermal spraying methods encompass coating methods in which a thermally sprayed coating film is obtained by introducing a thermal spraying material into this gas stream and heating and accelerating the thermal spraying material so as to deposit the thermal spraying material on a base material. For example, when a HVOF thermal spraying method is used, a thermal spraying material is supplied to a supersonic combustion flame jet at a temperature of 2000° C. to 3000° C., thereby softening or melting the thermal spraying material and enabling the thermal spraying material to impact on a base material at a high speed of 500 to 1000 m/s and accumulate on the base material. The fuel used in high velocity flame spraying may be a hydrocarbon gas fuel such as acetylene, ethylene, propane or propylene, or a liquid fuel such as kerosene or ethanol. In addition, the temperature of the supersonic combustion flame increases as the melting point of the thermal spraying material increases, and from this perspective, use of a gas fuel is preferred.

In addition, it is possible to use a thermal spraying method known as a warm thermal spraying method, which corresponds to the HVOF thermal spraying method described above. Typically, a warm thermal spraying method is a method in which a thermally sprayed coating film is formed by thermally spraying in a state whereby the temperature of the combustion flame in the HVOF thermal spraying method described above is lowered by mixing a cold gas comprising nitrogen or the like at a temperature close to room temperature with the combustion flame. The state of thermal spraying material is not limited to a completely molten state, and it is possible to thermally spray the thermal spraying material in a partially molten state or in a softened state at a temperature that is not higher than the melting point of the thermal spraying material. For example, when this warm thermal spraying method is used, a thermal spraying material is supplied to a supersonic combustion flame jet at a temperature of 1000° C. to 2000° C., thereby softening or melting the thermal spraying material and enabling the thermal spraying material to impact on a base material at a high speed of 500 to 1000 m/s and accumulate on the base material.

A HVAF thermal spraying method is a thermal spraying method in which air is used instead of oxygen as the combustion gas in the HVOF thermal spraying method described above. When a HVAF thermal spraying method is used, the thermal spraying temperature can be lower than in a HVOF thermal spraying method. For example, by supplying a thermal spraying material to a supersonic combustion flame jet at a temperature of 1600° C. to 2000° C., the thermal spraying material softens or melts, thereby enabling thermal spraying particles to impact on a base material at a high speed of 500 to 1000 m/s and accumulate on the base material.

[Thermally Sprayed Coating Film]

The thermally sprayed coating film disclosed here is formed by thermally spraying the thermal spraying material described above onto a surface of an arbitrary base material. Oxidation of the thermal spraying material described above during thermal spraying is suppressed. Therefore, the thermally sprayed coating film is constituted as a coating film comprising yttrium fluoride ($YF_3$) as the primary component. Here, "primary component" means that among the constituent components that constitute the thermally sprayed coating film, yttrium fluoride accounts for 70% by mass or more of the thermally sprayed coating film, preferably 80% by mass or more, and more preferably 90% by mass or more, for example 95% by mass or more. Yttrium fluoride may account for, for example, 98% by mass or more or 99% by mass or more.

Moreover, even in cases where the material disclosed here is used, yttrium oxyfluorides may be contained in addition to yttrium fluoride in the thermally sprayed coating film if thermal spraying is carried out under ordinary thermal spraying conditions. For example, the proportion of yttrium fluoride can be reduced and the proportion of yttrium oxyfluorides can be increased in comparison with the thermal spraying material used in the thermal spraying. These yttrium oxyfluorides may include substances having a variety of compositions, such as the general formulae YOF and $Y_5O_4F_7$. The proportion of these yttrium oxyfluorides is not particularly limited, but is preferably a proportion of 30% by mass or less in the thermally sprayed coating film. The proportion of yttrium oxyfluorides is more preferably 20% by mass or less, and particularly preferably 10% by mass or less. In addition, a preferred aspect of the thermally sprayed coating film, like the thermal spraying material, can be one in which the thermally sprayed coating film is constituted substantially from only yttrium fluoride and yttrium oxyfluorides. In such cases, it can be understood that no diffraction peak attributable to a compound other than yttrium fluoride and yttrium oxyfluorides is detected when the thermally sprayed coating film is subjected to X-Ray diffraction analysis.

Meanwhile, it is preferable for the thermally sprayed coating film to contain no yttrium oxide, which is a direct source of ultrafine particles. Rare earth element oxides such as yttrium oxide have the characteristic of being relatively hard, but brittle. Therefore, when exposed to a plasma environment caused by dry etching or the like, a part of this yttrium oxide detaches and generates ultrafine particles. In addition, if the thermally sprayed coating film contains yttrium oxide, yttrium oxide parts are preferentially eroded when exposed to halogen gas plasma. Therefore, the content of yttrium oxide is preferably 3% by mass or less, and more preferably 1% by mass or less, of the thermally sprayed coating film and it is preferable for the thermally sprayed coating film to contain substantially no yttrium oxide. For example, it is preferable for no diffraction peak attributable to yttrium oxide to be detected when the thermally sprayed coating film is subjected to X-Ray diffraction analysis.

Therefore, by carrying out thermal spraying using the thermal spraying material disclosed here, it is not possible to prevent a certain degree of oxidation of yttrium fluoride in the thermal spraying material, but yttrium fluoride is preferentially transformed into yttrium oxyfluorides, not yttrium oxide. This may be an occurrence that is unlikely to be seen in thermally sprayed coating films formed using yttrium oxide-containing thermal spraying materials. Therefore, if the thermally sprayed coating film does not contain yttrium oxide, the occurrence of particles can be suppressed to a high extent in cases where exposure to halogen gas plasma occurs. Therefore, this thermally sprayed coating film may exhibit plasma erosion resistance, and especially excellent resistance to erosion by halogen-based plasma.

Moreover, because the thermally sprayed coating film is obtained using a thermal spraying material comprising composite particles, the thermal spraying material is sufficiently melted/softened during thermal spraying and a compact thermally sprayed coating film is formed on a base material. The porosity of this thermally sprayed coating film is less than approximately 4%. If the porosity of the thermally sprayed coating film is less than 4%, the texture of the thermally sprayed coating film is compact, the area exposed to plasma is reduced, and plasma erosion resistance can be significantly increased. The porosity of the thermally sprayed coating film may be 3.5% or less or 3% or less (for example 1% to 3%). Alternatively, the porosity may be, for example, 1% or less.

Moreover, a low degree of particle occurrence is required in dry etching apparatuses used for producing semiconductor devices. Causes of particle occurrence include detachment of reaction products attached to the inside of a vacuum chamber and chamber degradation caused by use of halogen gas plasma and oxygen gas plasma. Particles become more of a problem as the particle size thereof increases, and as precision processing has become more precise in recent years, a need has arisen to strictly control the occurrence of particles having sizes of 0.2 µm or less (less than 0.2 µm, for example 0.1 µm or less). Occurrence of particles having sizes of 0.2 µm or more could occur in conventional thermally sprayed coating films, but by carrying out suitable thermal spraying using the thermal spraying material disclosed here, it is possible to obtain a thermally sprayed coating film having excellent plasma erosion resistance. Typically, a degenerated layer that is a cause of coarse particles having sizes of approximately 0.2 µm or more in current dry etching environments is not formed in the thermally sprayed coating film disclosed here. In cases where the thermally sprayed coating film disclosed here is eroded in a dry etching environment so as to generate particles, these particles are constituted from a degenerated layer of particles having sizes of approximately 0.2 µm or less (typically 0.1 µm or less). In addition, because formation of a degenerated layer is suppressed in the thermally sprayed coating film disclosed here, the occurrence of ultrafine particles having sizes of approximately 0.2 µm or less (for example, 0.1 µm or less, typically 0.06 µm or less, preferably 19 nm or less, more preferably 5 nm or less, and most preferably 1 nm or less) is suppressed. For example, the number of such particles generated can be reduced to substantially zero.

Moreover, the plasma erosion resistance of this type of thermally sprayed coating film can be evaluated by, for example, measuring the erosion rate, which indicates the degree to which the thermally sprayed coating film has been eroded, when the thermally sprayed coating film (or thermally sprayed coating film-equipped member) is exposed to a prescribed plasma environment. The method for evaluating plasma erosion resistance by means of erosion rate is explained in detail in the working examples given below.

Several working examples relating to the present invention will now be explained, but the present invention is in no way limited to these working examples.

[Production of Thermal Spraying Material]

Example 1

A thermal spraying material of Example 1 was produced by using an yttrium fluoride powder having an average particle diameter of 3 µm as a raw material, dispersing this raw material in a dispersion medium together with a resin binder, granulating by means of a spray drying method, and then firing. The resin binder was blended at a proportion of 1.0 part by mass relative to 100 parts by mass of the yttrium fluoride powder. Moreover, when the thermal spraying material of Example 1 was produced, a granular powder was first prepared by spraying the raw material dispersion liquid into a gas stream using a spray dryer so as to evaporate the dispersion medium from sprayed liquid droplets. The granular powder was then introduced into a multi-atmosphere furnace and fired under prescribed firing conditions. As shown in Table 1 below, the firing conditions were a vacuum atmosphere as the firing atmosphere, a firing temperature of 1100° C., and a firing time of approximately 5 minutes.

Example 2

A thermal spraying material of Example 2 was obtained in the same way as in Example 1, except that the firing atmosphere was a $N_2$ atmosphere.

Example 3

A thermal spraying material of Example 3 was obtained in the same way as in Example 1, except that an yttrium fluoride powder having an average particle diameter of 5 µm was used as the raw material and the firing atmosphere was an Ar atmosphere.

Example 4

A thermal spraying material of Example 4 was obtained in the same way as in Example 1, except that the liquid droplet size was increased, the firing atmosphere was an Ar atmosphere, and the firing temperature was 900° C. Moreover, the size of the liquid droplets in the spray drying can be adjusted as appropriate by, for example, altering the shape of the disk or the speed of rotation in cases where a rotary atomizer type spray dryer is used. The same applies hereinafter.

Example 5

A thermal spraying material of Example 5 was obtained in the same way as in Example 4, except that an yttrium fluoride powder having an average particle diameter of 0.1 µm was used as the raw material and the liquid droplet size was reduced.

Example 6

A thermal spraying material of Example 6 was obtained in the same way as in Example 4, except that an yttrium fluoride powder having an average particle diameter of 5 µm was used as the raw material and the liquid droplet size was reduced.

Example 7

A thermal spraying material of Example 7 was obtained in the same way as in Example 1, except that an yttrium fluoride powder having an average particle diameter of 0.1 µm was used as the raw material, the liquid droplet size was reduced, the firing atmosphere was an Ar atmosphere, and the firing temperature was 1000° C.

Example 8

A thermal spraying material of Example 8 was obtained in the same way as in Example 1, except that the liquid droplet size was reduced, the firing atmosphere was an Ar atmosphere, and the firing temperature was 700° C.

Example 9

A thermal spraying material of Example 9 was obtained in the same way as in Example 1, except that the liquid droplet size was increased, and the firing temperature was 400° C.

Example 10

A thermal spraying material of Example 10 was obtained in the same way as in Example 1, except that an yttrium fluoride powder having an average particle diameter of 30 µm was used as the raw material and the firing temperature was 400° C.

Example 11

A thermal spraying material of Example 11 was obtained in the same way as in Example 1, except that the firing atmosphere was an atmospheric atmosphere, and the firing temperature was 900° C. Moreover, firing a granular powder in an atmospheric atmosphere at a temperature of 900° C. firing conditions that were commonly used in the past.

Example 12

A thermal spraying material of Example 12 was obtained in the same way as in Example 1, except that the liquid droplet size was increased, the firing atmosphere was an atmospheric atmosphere, and the firing temperature was 800° C.

Example 13

A thermal spraying material of Example 13 was obtained in the same way as in Example 1, except that the liquid droplet size was increased, the firing atmosphere was an air atmosphere, and the firing temperature was 500° C.

Example 14

A thermal spraying material of Example 14 was obtained in the same way as in Example 1, except that an yttrium fluoride powder having an average particle diameter of 5 µm was used as the raw material, the firing atmosphere was an atmospheric atmosphere, and the firing temperature was 100° C.

Example 15

A thermal spraying material of Example 15 was obtained in the same way as in Example 1, except that an yttrium fluoride powder having an average particle diameter of 0.1 µm was used as the raw material, the firing atmosphere was an atmospheric atmosphere, and the firing temperature was 1000° C.

Example 16

An yttrium fluoride powder having an average particle diameter of 1 µm was used as a raw material. In addition, a resin binder was blended at a proportion of 5.0 parts by mass relative to 100 parts by mass of the yttrium fluoride powder. A thermal spraying material of Example 16 was obtained in the same way as in Example 1, except that the firing atmosphere was an Ar atmosphere, and the firing temperature was 1000° C.

Example 17

An yttrium fluoride powder having an average particle diameter of 3 µm was used as a raw material, and a resin binder was blended at a proportion of 3.0 parts by mass relative to 100 parts by mass of the yttrium fluoride powder. A thermal spraying material of Example 17 was obtained in the same way as in Example 1, except that the firing atmosphere was an Ar atmosphere, and the firing temperature was 1000° C.

Example 18

An yttrium fluoride powder having an average particle diameter of 3 µm was used as a raw material, and a resin binder was blended at a proportion of 2.0 parts by mass relative to 100 parts by mass of the yttrium fluoride powder. A thermal spraying material of Example 18 was obtained in the same way as in Example 1, except that the firing atmosphere was an Ar atmosphere, and the firing temperature was 900° C.

Example 19

An yttrium fluoride powder having an average particle diameter of 5 µm was used as a raw material, and a resin binder was blended at a proportion of 1.5 parts by mass relative to 100 parts by mass of the yttrium fluoride powder. A thermal spraying material of Example 19 was obtained in the same way as in Example 1, except that the firing atmosphere was an Ar atmosphere, and the firing temperature was 900° C.

Figure 2:
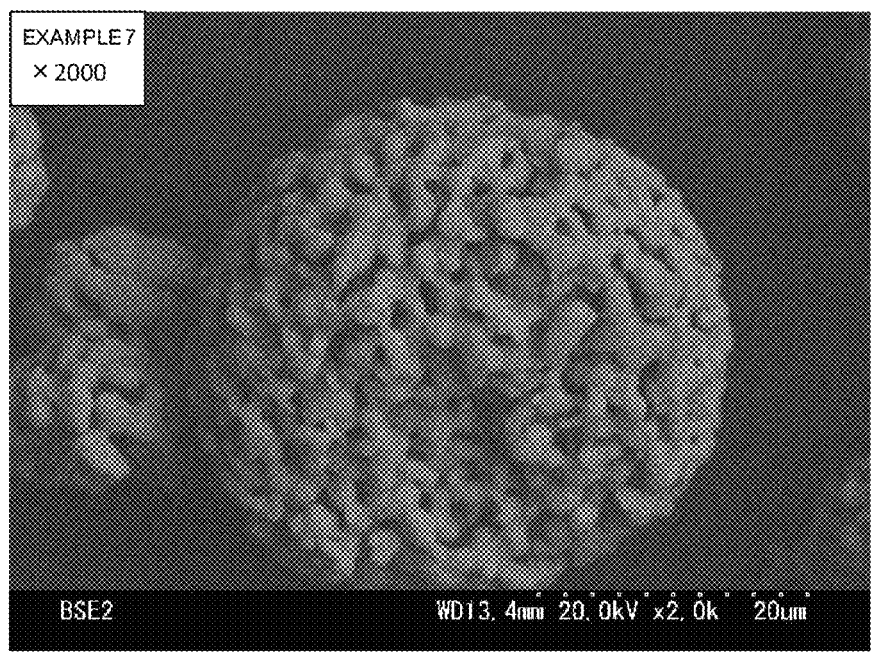
FIG. 2 is a SEM image showing a composite particle in the thermal spraying material of Example 7, which is a working example.
Figure 3:
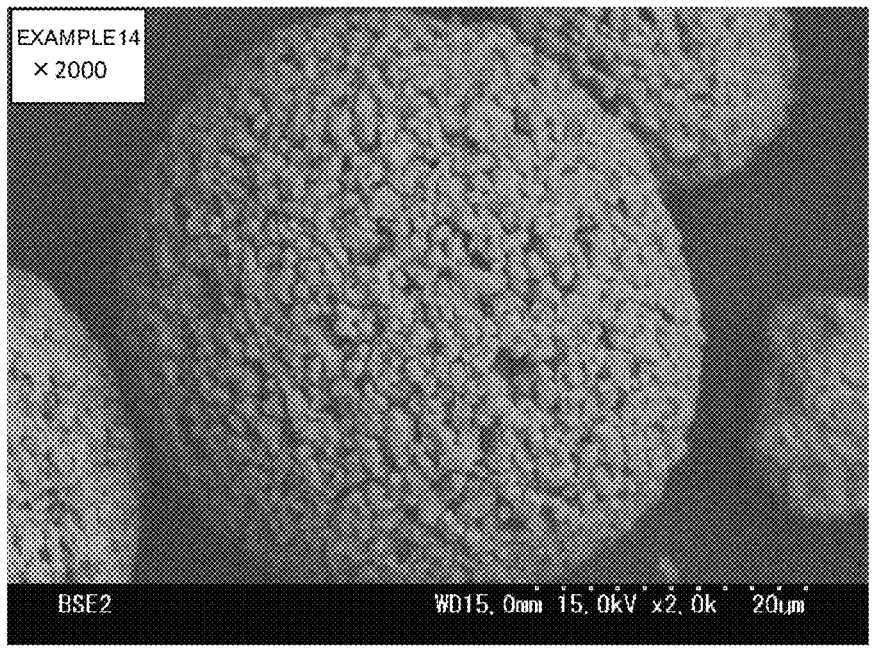
FIG. 3 is a SEM image showing a composite particle in the thermal spraying material of Example 14, which is a comparative example.

The thus obtained thermal spraying materials of Examples 1 to 19 were investigated in terms of composition, average particle diameter, lightness L and bulk density, as shown below, and these results are shown in Table 1. Moreover, the fine structure of composite particles in the thermal spraying materials was observed using a scanning electron microscope (SEM). For reference purposes, observations of the thermal spraying materials of Examples 4, 7 and 14 are shown in FIGS. 1 to 3.

(Composition)

Figure 4:
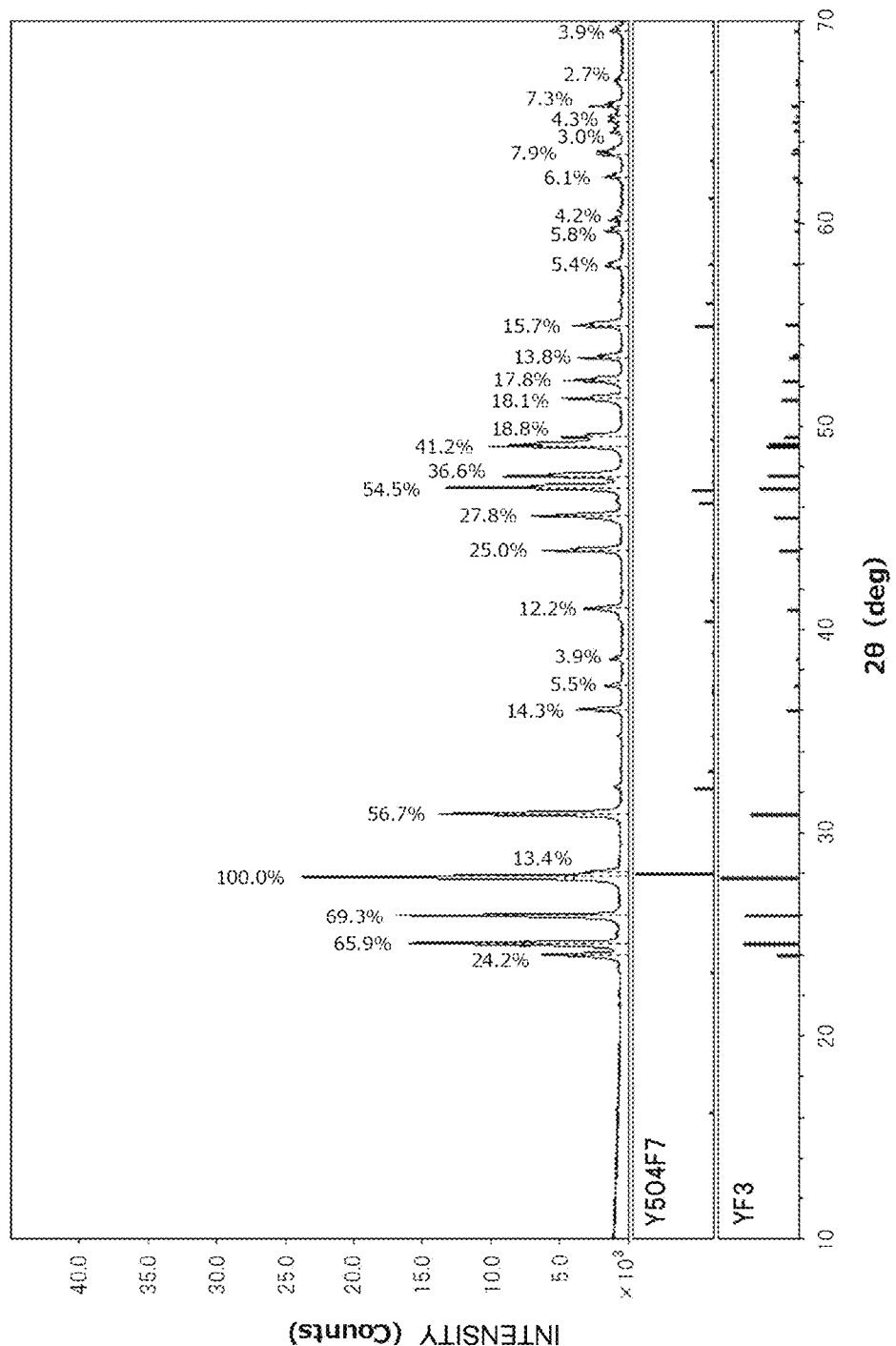
FIG. 4 is an X-Ray diffraction pattern obtained using the thermal spraying material of Example 3, which is a working example.

The composition of each thermal spraying material was investigated by means of X-Ray diffraction analysis. The X-Ray diffraction apparatus was an Ultima IV available from Rigaku Corporation, and measurements were carried out using CuKα radiation as an X-Ray source, an accelerating voltage of 20 kV, an accelerating current of 10 mA, a scanning range 2θ of 10° to 70°, a scanning speed of 10°/min and a sampling width of 0.01°. Here, a divergent slit was 1°, a divergence vertical restriction slit was 10 mm, a scattering slit was ⅙°, a light-receiving slit was 0.15 mm, and the offset angle was 0°. Crystal phases detected in obtained X-Ray diffraction patterns are shown in the "Composition" column for the "Thermal spraying material" in Table 1. For reference purposes, an X-Ray diffraction pattern obtained using the thermal spraying material of Example 3 is shown in FIG. 4.

(Average Particle Diameter)

Average particle diameter was measured using a LA-300 laser diffraction/scattering type particle size distribution measuring device available from Horiba, Ltd. The volume-based $D_{50\%}$ particle diameter was taken to be the average particle diameter. Obtained average particle diameters are shown in the "$D_{50}$" column for the "Thermal spraying material" in Table 1.

(Lightness L)

Lightness L was measured using the Lab color coordinate system using a spectroscopic colorimeter (a SE 2000 available from Nippon Denshoku Industries Co., Ltd.). The lightness L value was taken to be the arithmetic mean value of lightness L values obtained when the thermal spraying material of each example was measured 10 times. These results are shown in the "L value" column for the "Thermal spraying material" in Table 1.

(Bulk Density)

The bulk density of each thermal spraying material was measured. The bulk density was taken to be the initial bulk density measured using a constant mass measurement method in accordance with JIS R 1628:1997. These results are shown in the "Bulk density" column for the "Thermal spraying material" in Table 1.

[Production of Thermally Sprayed Coating Film-Equipped Members]

In addition, thermally sprayed coating film-equipped members were obtained by thermally spraying the thermal spraying materials of Examples 1 to 19 onto base materials. Thermal spraying conditions were as described below.

First, a sheet material (measuring 70 mm×50 mm×2.3 mm) comprising an aluminum alloy (Al 6061) was prepared as a base material to be thermally sprayed. The thermal spraying surface of the base material was subjected to a blasting treatment using a brown alumina grinding material (A #40). Thermal spraying was carried out by means of an atmospheric plasma spraying method using a commercially available plasma spraying apparatus (SG-100 available from Praxair Surface Technologies, Inc.). Plasma was generated at a voltage of 37.0 V and a current of 900 A using argon gas at 50 psi (0.34 MPa) and helium gas at 50 psi (0.34 MPa) as plasma working gases. A thermally sprayed coating film having a thickness of 200 μm was formed by supplying the thermal spraying material to the thermal spraying apparatus at a speed of 20 g/min using a powder supply machine (Model 1264 available from Praxair Surface Technologies, Inc.). Moreover, the movement speed of the thermal spraying gun was 24 m/min, and the spraying distance was 90 mm.

The thermally sprayed coating films of the thermally sprayed coating film-equipped members obtained in Examples 1 to 19 were investigated in terms of film formation rate, porosity and erosion rate ratio, as shown below, and these results are shown in Table 1.

(Film Formation Rate)

When thermally sprayed coating films were formed using the thermal spraying materials, the rate at which the thickness of the thermally sprayed coating film increased per unit time was calculated as the film formation rate. The increase in thickness of the thermally sprayed coating film was determined by masking a part of the base material, carrying out thermal spraying for a prescribed period of time, and measuring the height of a step, which was determined by measuring the height of a step between a thermally sprayed portion and a masked portion, using a surface roughness measuring device (SV-3000CNC available from Mitutoyo Corporation). The film formation rate was then calculated by dividing the measured step height by the thermal spraying time. These results are shown in the "Film formation rate" column for the "Thermally sprayed coating film" in Table 1.

(Porosity)

Porosity was calculated from the areal proportion of pores in a cross section of a thermally sprayed coating film. First, a thermally sprayed coating film-equipped member was cut along a surface perpendicular to the surface of the base material, the obtained cross section was resin-filled and polished, and an image of the cross section was then taken using a digital microscope (VC-7700 available from Omron Corporation). The area of pore portions in this cross section image was determined by analyzing the image using image analysis software (Image Pro available from Nippon Roper K.K.), and the proportion of the area of these pore portions relative to the overall cross section was calculated. These results are shown in the "Porosity" column for the "Thermally sprayed coating film" in Table 1.

(Erosion Rate Ratio)

The thermally sprayed coating films were subjected to plasma exposure tests in the following way. First, a test piece was prepared by forming a thermally sprayed coating film having a thickness of 200 μm and dimensions of 20 mm×20 mm on a base material under the thermal spraying conditions described above, mirror polishing the surface of the thermally sprayed coating film to a coating film thickness of 100 μm, and masking the four corners of the thermally sprayed coating film with masking tape. This test piece was then placed on a silicon wafer having a diameter of 300 mm, which was disposed on a stage in a chamber of a parallel plate type semiconductor device production apparatus (NLD-800 available from ULVAC, Inc.). Next, the central part of the silicon wafer and thermally sprayed coating film was etched by repeatedly generating fluorine gas plasma (F-based plasma) or chlorine gas plasma (Cl-based plasma) using a prescribed cycle under the conditions shown in Table 2 below. Moreover, F-based plasma was generated using a mixed gas of $CF_4$ and $O_2$ (volume ratio: 53.2/5) as an etching gas, as shown in Table 2 below. In addition, Cl-based plasma was generated using a mixed gas of $CCl_4$ and $O_2$ (volume ratio: 53.2/5) as an etching gas. The plasma exposure time was approximately 0.9 hours, including intervals (cooling cycle times). Next, the reduction in thickness of the thermally sprayed coating film by the plasma was measured so as to determine the etching amount (erosion amount), and the plasma erosion rate was calculated as the erosion amount per unit time. The reduction in thickness of the thermally sprayed coating film was determined by measuring the height of a step between the masked portion and the plasma-exposed surface using a surface roughness measuring device (SV-3000CNC available from Mitutoyo Corporation). If the plasma erosion rate of the thermally sprayed coating film of Example 14 is taken to be a standard value of "1", the plasma erosion rate ratio is determined by calculating the plasma erosion rate (relative value) of a thermally sprayed coating film on the basis of the following formula: (plasma erosion rate of thermally sprayed coating film of Example 14 [μm/hr])÷(plasma erosion rate of thermally sprayed coating film of example in question [μm/hr]). Moreover, the thermally sprayed coating film of Example 14, which is used as a standard, was formed using a thermal spraying material obtained by firing a publicly known granular powder in an atmospheric atmosphere at a temperature of 900° C. These results are shown in the "Plasma erosion rate ratio" column for the "Thermally sprayed coating film" in Table 1.

Firing in Non-Oxidizing Atmosphere; Examples 1 to 10 and 16 to 19

As is clear from the thermal spraying material composition column in Table 1, in Examples 1 to 10 and 16 to 19, in which granulated powders were fired in noble gas atmospheres, inert atmospheres and vacuum atmospheres, which are non-oxidizing atmospheres, it was understood that the raw material powders in all of these examples were not oxidized and it was possible to obtain thermal spraying materials in which the yttrium fluoride composition was maintained. Moreover, as shown in FIG. 4, an extremely small amount of an yttrium oxyfluoride ($Y_5O_4F_7$) was detected, along with yttrium fluoride ($YF_3$), in an XRD pattern of the thermal spraying material of Example 3. However, the proportion of the yttrium oxyfluoride was less than 0.5 mol % of the overall thermal spraying material, and it is thought that a thermal spraying material comprising substantially yttrium fluoride was obtained.

Sintering of yttrium fluoride microparticles progresses at a temperature of approximately 900° C. or higher, and sintering is difficult at a firing temperature of, for example, 800° C. or lower. In addition, it was understood that in thermal spraying materials in which the amount of binder used in the granulated powder was approximately the same, as in Examples 1 to 10, the L value of the thermal spraying material tended to decrease as the firing temperature

TABLE 1

| | | Raw material powder | | Thermal spraying material | | | | Thermally sprayed coating film | | |
| | Firing | | | | Amount of binder | | | Film | | |
| | | | | | | | | | | Erosion |
| No. | Firing atmosphere | temperature (° C.) | Composition | $D_{50}$ (μm) | Composition | $D_{50}$ (μm) | (parts by mass) | L value | Bulk density (g/cm³) | formation rate (μm/min) | Porosity (%) | rate ratio |
|---|---|---|---|---|---|---|---|---|---|---|---|---|
| 1 | Vacuum | 1100 | $YF_3$ | 3 | $YF_3$ | 40 | 1.0 | 81.6 | 1.12 | 20 | 2 | 0.90 |
| 2 | $N_2$ | 1100 | $YF_3$ | 3 | $YF_3$ | 40 | 1.0 | 84.0 | 1.23 | 20 | 2 | 0.90 |
| 3 | Ar | 1100 | $YF_3$ | 5 | $YF_3$ | 40 | 1.0 | 85.1 | 1.16 | 20 | 3 | 0.88 |
| 4 | Ar | 900 | $YF_3$ | 3 | $YF_3$ | 45 | 1.0 | 87.4 | 1.28 | 20 | 3 | 0.91 |
| 5 | Ar | 900 | $YF_3$ | 0.1 | $YF_3$ | 35 | 1.0 | 88.3 | 1.48 | 20 | 1 | 0.85 |
| 6 | Ar | 900 | $YF_3$ | 5 | $YF_3$ | 40 | 1.0 | 90.3 | 1.00 | 20 | 3 | 0.92 |
| 7 | Ar | 1000 | $YF_3$ | 0.1 | $YF_3$ | 30 | 1.0 | 90.8 | 1.62 | 20 | 1 | 0.85 |
| 8 | Ar | 700 | $YF_3$ | 3 | $YF_3$ | 35 | 1.0 | 93.7 | 0.96 | 13 | 4 | 0.95 |
| 9 | Vacuum | 400 | $YF_3$ | 3 | $YF_3$ | 50 | 1.0 | 96 | 0.93 | 10 | 9 | 1.00 |
| 10 | Vacuum | 400 | $YF_3$ | 5 | $YF_3$ | 40 | 1.0 | 96 | 1.13 | 10 | 9 | 1.00 |
| 11 | Atmospheric | 900 | $YF_3$ | 3 | $YF_3$ + YOF | 40 | 1.0 | 97 | 1.7 | 10 | 10 | 1.00 |
| 12 | Atmospheric | 800 | $YF_3$ | 3 | $YF_3$ + YOF | 50 | 1.0 | 98 | 1.7 | 10 | 8 | 0.96 |
| 13 | Air | 500 | $YF_3$ | 3 | $YF_3$ | 45 | 1.0 | 99 | 0.96 | 10 | 5 | 0.98 |
| 14 | Atmospheric | 100 | $YF_3$ | 5 | $YF_3$ | 40 | 1.0 | 99 | 1.3 | 10 | 6 | 0.98 |
| 15 | Atmospheric | 1000 | $YF_3$ | 0.1 | $YF_3$ + YOF | 40 | 1.0 | 99 | 1.8 | 10 | 15 | 1.10 |
| 16 | Ar | 1000 | $YF_3$ | 1 | $YF_3$ | 40 | 5.0 | 5.4 | 1.16 | 20 | 3 | 0.92 |
| 17 | Ar | 1000 | $YF_3$ | 3 | $YF_3$ | 40 | 3.0 | 20.8 | 1.16 | 20 | 3 | 0.90 |
| 18 | Ar | 900 | $YF_3$ | 3 | $YF_3$ | 40 | 2.0 | 54.6 | 1.16 | 20 | 3 | 0.84 |
| 19 | Ar | 900 | $YF_3$ | 5 | $YF_3$ | 40 | 1.5 | 71.8 | 1.16 | 20 | 3 | 0.88 |

TABLE 2

| Plasma generation conditions | F type plasma | Cl type plasma |
|---|---|---|
| Etching gas composition | $CF_4/O_2$ | $CCl_4/O_2$ |
| Gas flow rate (sccm) | 53.2/5 | 53.2/5 |
| Chamber pressure (Pa) | 1 | 1 |
| Plasma generation power (Top) (W) | 1500 | 1500 |
| Plasma generation power (Bottom) (W) | 400 | 400 |
| Bias area (mm²) | 100 (4") | 100 (4") |
| Power density (W/cm²) | 5.1 | 5.1 |
| Exposure time (hrs) | 0.9 | 0.9 |
| Exposure/cooling cycle (min) | 0.5/1.5 | 0.5/1.5 | increased. Therefore, it is thought that volatilization of fluorine from yttrium fluoride is less likely to occur at a low firing temperature and more likely to occur at a high firing temperature. For example, the thermal spraying materials of Examples 9 and 10, in which firing was carried out at 400° C., had high L values of 96, and the thermal spraying material of Example 8, in which firing was carried out at 700° C., had a somewhat lower L value of 93.7, but the reduction in L value was not sufficient. Conversely, in the thermal spraying materials of Examples 1 to 7, in which firing was carried out at 900° C. to 1100° C., the L values were 91 or less, and it is thought that fluorine was sufficiently lost while the yttrium fluoride composition was maintained. Moreover, in Example 7, in which a powder having an average particle diameter of 0.1 μm was used as a raw material for the thermal spraying material, firing was carried out at a high temperature of 1000° C., but the L value was not particularly reduced. This is thought to be because sintering progressed from a low temperature and compacting occurred earlier due to the raw material powder being microparticles, and loss of fluorine hardly occurred.

Moreover, FIG. 1 is a SEM image showing the structure of a composite particle in the thermal spraying material of Example 4, and FIG. 2 is a SEM image showing the structure of a composite particle in the thermal spraying material of Example 7. It is understood from FIG. 2 that yttrium fluoride microparticles in Example 7 all have a rounded shape, form a neck, and are integrated with each other at a relatively large interface. It is also understood that almost all of the observed yttrium fluoride microparticles were bound to and integrated with each other. The composite particles in Example 7 were obtained using a powder having an average particle diameter of 0.1 μm as a raw material, but the size of microparticles that constitute the composite particles grew to a size of approximately 1 μm. This suggests that in the composite particles in Example 7, all of the yttrium fluoride microparticles were bound to and integrated with each other.

In addition, despite being able to be clearly understood by comparing with the composite particles in the thermal spraying material of Example 14 mentioned later, it was confirmed that in Example 7, the raw material powder underwent grain growth as a result of sintering, and spheroidization occurred as a result of surface energy being stabilized, thereby constituting the composite particles from yttrium fluoride microparticles. In addition, although pores were observed between yttrium fluoride microparticles, it was confirmed that approximately spherical composite particles were formed on the whole.

As shown in FIG. 1, sintering progressed further in the thermal spraying material of Example 4, and it was confirmed that the composite particles were constituted from several yttrium fluoride microparticles. That is, it can be understood that yttrium fluoride microparticles having an average particle diameter of approximately 5 to 20 μm were formed from a raw material powder having an average particle diameter of 3 μm, and that these yttrium fluoride microparticles constituted the composite particles. It is understood that in these yttrium fluoride microparticles, particles of the raw material powder were sufficiently sintered, meaning that these particles underwent significant grain growth and became coarser, and that these particles were bound to and integrated with each other at a large interface, thereby forming dense composite particles having a smoother surface than the composite particles of Example 7.

However, it was understood from Examples 16 to 19 that if a large amount of binder was used when producing the granulated powder, the L value greatly decreased. For example, as can be understood by comparing Example 16 with Example 17 and Example 18 with Example 19, it was understood that even if the firing atmosphere and temperature were the same, the L value greatly decreased if the average particle diameter of the raw material powder was reduced and the amount of binder was increased. In addition, as can be understood by comparing Example 17 with Example 18, it was understood that even if the firing atmosphere and raw material powder were the same, the L value greatly decreased if the amount of binder was increased and the firing temperature was increased. As shown in Example 16, for example, it was understood that the L value was reduced to 5.4 if the average particle diameter of the raw material powder was slightly reduced to 1 μm and the firing temperature in an Ar atmosphere was increased to 1200° C. In view of these findings also, it can be understood that the L value of the composite particles decreases as sintering of the yttrium fluoride microparticles progresses or as the binder is burned off. That is, it was understood that a good sintered state as a thermal spraying material can be grasped from the L value. Moreover, it was understood that in cases where sintering occurs in an Ar atmosphere, the bulk density is not particularly high, namely approximately 1.16, even if sintering occurs at such a high temperature.

In addition, in the thermal spraying materials of Examples 1 to 8 and 16 to 19, in which the firing temperature was relatively high, it could be confirmed that the film formation rate increased and the porosity decreased because composite particles were bound by sintering. Furthermore, in cases where the thermal spraying materials of Examples 1 to 7 and 16 to 19, which had low L values of 91 or less, were used, it was understood that the erosion rate ratios of the thermally sprayed coating films could be significantly lowered because oxidation of the thermal spraying materials during thermal spraying could be suppressed by loss of fluorine. Moreover, it was confirmed that in the thermal spraying materials of Examples 1 to 8 and 16 to 19, the bulk density of the thermal spraying materials increased as a result of sintering progressing, meaning that thermally sprayed coating films having a low porosity were formed. It is thought that a low porosity in a thermally sprayed coating film contributes to a reduction in erosion rate ratio. This is exhibited to a remarkable extent in the thermal spraying materials of Examples 1 to 7 and 16 to 19, in which the firing temperature was higher. In particular, in Examples 5 and 7, in which ultrafine particles having an average particle diameter of 0.1 μm were used as the raw material powder, and Examples 18 and 19, in which firing was carried out in an Ar atmosphere at a temperature of 1100° C. to 1150° C., it was understood that it was possible to form a thermally sprayed coating film having an erosion rate ratio of 0.88 or less and high erosion resistance. Conversely, in cases where the thermal spraying materials of Examples 9 and 10, in which sintering did not progress, were used, it was understood that particles disintegrated during thermal spraying due to the composite particles not being sintered, thereby causing the film formation rate to decrease. As a result, it was understood that the porosity of the thermally sprayed coating film increased and the erosion rate ratio of the thermally sprayed coating film also increased.

As a result, it can be said that it is preferable for a thermal spraying material to have an L value of 91 or less as a result of sintering progressing while the yttrium fluoride composition is maintained. Moreover, it is understood from the results of Examples 1 to 3 etc. that a non-oxidizing atmosphere may be any of a noble gas atmosphere, an inert atmosphere or a vacuum atmosphere.

Firing in Oxidizing Atmosphere; Examples 11 to 15

Conversely, in Examples 11 to 15, in which granulated powders were fired in an atmospheric atmosphere, it was understood that if the firing temperature was close to the drying temperature of 100° C., it was possible to obtain a thermal spraying material in which the yttrium fluoride composition of the raw material powder was maintained (Example 14). FIG. 3 is a SEM image showing the structure of a composite particle in the thermal spraying material of Example 14. Composite particles in Example 14 are granulated particles which have an average particle diameter of 40 µm and are granulated using a raw material powder having an average particle diameter of 5 µm, and particles of the raw material powder are bound to each other by means of a resin binder without being sintered or undergoing grain growth. In addition, it is understood that individual particles have a sharp-cornered shape derived from fragmentation and an orthorhombic crystal structure. In addition, it was understood that even if heating was carried out in an atmospheric atmosphere, it was possible to obtain a thermal spraying material in which the yttrium fluoride composition of the raw material powder was maintained if the firing temperature was 500° C. or lower which is a condition in which firing did not progress (Example 13). It was confirmed that because loss of fluorine did not occur in these thermal spraying materials in which firing did not progress, a thermal spraying material having a high L value of 97 to 99 inherent in yttrium fluoride was obtained. However, it was understood that if the firing temperature was 800° C. or higher, yttrium fluoride was oxidized and yttrium oxyfluoride (YOF) was formed in the thermal spraying material (Examples 11, 12 and 15). These thermal spraying materials were oxidized because oxygen was supplied to the granulated particles by the firing. It was confirmed from this that a thermal spraying material having a high L value was obtained because the yttrium fluoride underwent oxygen replenishment rather than simply undergoing fluorine loss. Although not shown in the tables, it was confirmed from XRD results that the proportion of YOF increased as the firing temperature in air increased.

It was understood that thermally sprayed coating films obtained by thermally spraying the thermal spraying materials of Examples 11 to 15 tended to have low film formation rates and high porosity values. In particular, it was confirmed that the thermal spraying materials of Examples 11, 12 and 15 gave thermally sprayed coating films having high porosity values despite having high bulk densities due to sintering progressing. Although the details are not clear, it is thought that because these thermal spraying materials contained YOF prior to thermal spraying, the thermal spraying materials readily underwent decomposition, volatilization, or the like, upon thermal spraying, which led to a reduction in film formation rate and an increase in porosity. Therefore, it was understood that if a thermal spraying material obtained by firing in air was used, fluorine volatilizes during film formation, which leads to the porosity of the formed thermally sprayed coating film being significantly increased to 8% to 15%. In addition, it was understood that as the porosity of a thermally sprayed coating film increases, the erosion rate ratio increases and the plasma erosion resistance decreases. It can be confirmed from this that by using a thermal spraying material having an L value of 91 or less by being sufficiently sintered in a non-oxidizing atmosphere, it is possible to form a thermally sprayed coating film having improved plasma erosion resistance.

Specific examples of the present invention have been explained in detail above, but these are merely examples, and do not limit the scope of the invention. The features described in the claims can include aspects obtained by variously modifying or altering the specific examples shown above.

The invention claimed is:

1. A thermal spraying material comprising:
   granulated sintered composite particles in which a plurality of sintered yttrium fluoride microparticles are integrated with each other directly,
   wherein a lightness L is 91 or less in the Lab color space.

2. The thermal spraying material according to claim 1, wherein the lightness L is 5 or more and 91 or less.

3. The thermal spraying material according to claim 1, wherein the thermal spraying material is a powder comprising a plurality of the composite particles, and the bulk density of the powder is 1 to 1.7 g/cm$^3$.

4. The thermal spraying material according to claim 1, wherein, in an electron microscope observation of the composite particles, 40% by number or more of the yttrium fluoride microparticles are bound to and integrated with each other.

5. The thermal spraying material according to claim 1, wherein the thermal spraying material is a powder comprising a plurality of the composite particles, and the average particle diameter of the powder is 10 to 100 µm.

6. The thermal spraying material according to claim 1, wherein no diffraction peak attributable to yttrium oxide is detected in X-Ray diffraction analysis of the powder.

* * * * *